US012791006B2

(12) United States Patent
Bas Quesada et al.

(10) Patent No.: US 12,791,006 B2
(45) Date of Patent: Nov. 10, 2026

(54) COMPUTER-IMPLEMENTED METHOD FOR CALIBRATING WIND TURBINES IN A WIND FARM

(71) Applicant: Siemens Gamesa Renewable Energy Innovation & Technology S.L., Sarriguren (ES)

(72) Inventors: Jesus Bas Quesada, Madrid (ES); Carlos Moral Gonzalez, Madrid (ES); Felipe Palou Larranaga, Pamplona (ES); Juan Jose Pena Martinez, Gondomar (ES); Carlos Pizarro De La Fuente, Madrid (ES); Jaime Suarez Aizpun, Madrid (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 433 days.

(21) Appl. No.: 18/287,899

(22) PCT Filed: Apr. 4, 2022

(86) PCT No.: PCT/EP2022/058829

§ 371 (c)(1),
(2) Date: Oct. 23, 2023

(87) PCT Pub. No.: WO2022/228828

PCT Pub. Date: Nov. 3, 2022

(65) Prior Publication Data

US 2024/0209832 A1 Jun. 27, 2024

(30) Foreign Application Priority Data

Apr. 27, 2021 (EP) .................................... 21382365

(51) Int. Cl.
*F03D 7/02* (2006.01)
*F03D 7/04* (2006.01)
*F03D 17/00* (2016.01)

(52) U.S. Cl.
CPC .......... *F03D 7/0204* (2013.01); *F03D 7/048* (2013.01); *F03D 17/025* (2023.08)

(58) Field of Classification Search
CPC ...... F03D 7/0204; F03D 7/048; F03D 17/025; F03D 7/049; F03D 17/029;
(Continued)

(56) References Cited

U.S. PATENT DOCUMENTS

2015/0345476 A1* 12/2015 Gregg .................... F03D 7/048 702/92
2020/0166016 A1 5/2020 Cortiana
2021/0246875 A1* 8/2021 Fu .......................... F03D 7/042

FOREIGN PATENT DOCUMENTS

DE 102017114583 A1 * 1/2019 ............ F03D 17/00
EP 2 949 924 A1 12/2015
(Continued)

OTHER PUBLICATIONS

WO-2017148485-A1_translated (Year: 2017).*
(Continued)

*Primary Examiner* — Catherine T. Rastovski
*Assistant Examiner* — Michael J Singletary
(74) *Attorney, Agent, or Firm* — Schmeiser Olsen PLLC

(57) ABSTRACT

A computer-implemented method for calibrating a nacelle position of at least one wind turbine in a wind farm is provided having a plurality of spatially distributed wind turbines, in which a first calibration step of recalibrating a precalibrated nacelle position of at least one wind turbine is followed by a second calibration step, in which a wind direction sector specific further recalibrating of the nacelle
(Continued)

position of the at least one wind turbine to be calibrated is performed by applying a wind direction sector specific correction value for an identified wind direction sector to the previously obtained calibrated nacelle position.

15 Claims, 7 Drawing Sheets

(58) Field of Classification Search
CPC .......... F05B 2270/321; F05B 2270/329; F05B 2270/335; Y02E 10/72
See application file for complete search history.

(56) References Cited

FOREIGN PATENT DOCUMENTS

| | | | | |
|---|---|---|---|---|
| WO | WO-2014161626 A1 * | 10/2014 | ............. | F03D 17/00 |
| WO | WO-2017148485 A1 * | 9/2017 | ........... | F03D 7/0204 |

OTHER PUBLICATIONS

WO-2014161626-A1_translated (Year: 2014).*
DE-102017114583-A1_translated (Year: 2019).*
International Search Report and Written Opinion for PCT/EP2022/058829, mailed on Jul. 15, 2022.

* cited by examiner

COMPUTER-IMPLEMENTED METHOD FOR CALIBRATING WIND TURBINES IN A WIND FARM

CROSS-REFERENCE TO RELATED APPLICATIONS

This application claims priority to PCT Application No. PCT/EP2022/058829, having a filing date of Apr. 4, 2022, which claims priority to EP Application No. 21382365.1, having a filing date of Apr. 27, 2021, the entire contents both of which are hereby incorporated by reference.

FIELD OF TECHNOLOGY

The following relates to a computer-implemented method for calibrating a nacelle position of at least one wind turbine in a wind farm, a system comprising a system or means for carrying out the method, a computer program associated with the computer-implemented method and a computer-readable medium associated with the computer program.

BACKGROUND

Different methods for calibrating wind turbines in wind farms are known in the state of the conventional art. One known method is to stop the wind turbine to be calibrated and point it to known locations in order to calibrate it using trigonometry. Another known method is to use a compass in the wind turbine to be calibrated. In both of these methods, the wind turbine must be stopped.

The calibration of the wind turbines in the wind farm should be as exact as possible because the actual wind direction is very important in wake steering control operations for improving the annual energy production of the wind farm. That is, since wind turbines generate electricity from energy contained in the wind, the wind behind the wind turbines has less energy content than the wind in front of the wind turbines. In other words, wind turbines always cast a wind shadow on the downstream side. This results in wakes behind the wind turbines, which are turbulent wind tails with a lower wind speed compared to the wind in front of the wind turbines. The wakes cause a lower power production efficiency of the wind turbines affected by it. As the flow of the wind proceeds downstream, there is a spreading of the wake, and the wake may recover towards free stream conditions.

The aggregated influence on the energy production of the wind farm, which results from the changes in wind speed caused by the impact of the wind turbines on each other, is often referred to as the so-called wake effect. It is important to consider wake effects from neighboring wind turbines within the same wind farm or due to nearby other wind farms.

In wind farms, individual wind turbines are distributed spatially with a certain distance from one another to reduce turbulence on the leeward side. Also, wind farms are typically spatially distributed with a certain distance from one another. However, wake effects still occur. There is one predominantly used technique or, in other words, control operation for mitigating the effect of wakes on the annual energy production of a wind farm. It aims at reducing the wake effect in a wind farm. The above-mentioned wake steering control operation is performed by a wind turbine in front of the wind for a given wind direction. The wind turbines in front of the wind may also be referred to as the upstream wind turbines, whereas wind turbines downstream of the upstream wind turbine may be referred to as downstream wind turbines. In the wake steering control operation, the upstream wind turbine is angled towards the prevailing wind direction, or, in other words, a yaw misalignment of the upstream wind turbine is forced so as to steer the wake away from a downstream wind turbine. Thereby, the downstream wind turbine may become not or less effected by the wake and its power production efficiency may be improved.

From EP 2 949 924 A1 a computer-implemented method for recalibrating nacelle-positions of a plurality of wind turbines in a wind park is known. In embodiments, the method includes identifying at least two associated wind turbines wherein each associated wind turbine includes location information, determining a plurality of predicted wake features for the associated wind turbines based at least partially on the location information of each associated wind turbine, retrieving a plurality of historical performance data related to the associated wind turbines, determining a plurality of current wake features based on the plurality of historical performance data, identifying a variance between the predicted wake features and the current wake features, and determining a recalibration factor for at least one of the associated wind turbines based on the identified variance.

WO 2017/148485 A1 shows a method for determining a yaw position offset of a wind turbine. A neighboring wind turbine of the wind farm is identified, the neighboring wind turbine being arranged in the vicinity of the wind turbine. Produced power data and/or wind speed data from the wind turbine and from the neighboring wind turbine is obtained during a period of time, and a yaw position offset of the wind turbine is derived, based on the obtained produced power data and/or wind speed data, and based on the geographical positions of the wind turbine and the neighboring wind turbine. A local maximum and a local minimum being separated by an angular difference in yaw position being substantially equal to 180°.

However, in complex terrain, wakes can follow a trajectory different from one in flat terrains and this should be taken into account when controlling the wind turbines. In the known methods for calibrating wind turbines, an influence from orography is not accounted for and the wake steering control operations in wind turbines calibrated by the above methods may be inefficient because the wake steering control operation is performed on false calibration or, in other words, nacelle position data of the wind turbine.

SUMMARY

An aspect relates to a method for calibrating wind turbines in a wind farm, which does not have the above disadvantages, in particular does not need stopping of the wind turbines and delivers precise calibration.

In particular, the aspect is solved by a method—particularly a computer-implemented method—for calibrating a nacelle position of at least one wind turbine in a wind farm having a plurality of spatially distributed wind turbines 1, a system, a computer program product (non-transitory computer readable storage medium having instructions, which when executed by a processor, perform actions) and a computer-readable medium. Thereby, the features and details described in connection with the computer-implemented method for calibrating a nacelle position of at least one wind turbine in a wind farm having a plurality of spatially distributed wind turbines of embodiments of the invention apply in connection with the system of embodiments of the invention, the computer program of embodiments of the invention and the computer-readable medium of embodiments of the invention so that regarding the disclosure of the individual aspects of embodiments of the invention it is or can be referred to one another.

In particular, the aspect is solved by a method for calibrating a nacelle position of at least one wind turbine in a wind farm having a plurality of spatially distributed wind turbines, the method being particularly a computer-implemented method, wherein the method comprises a first calibration step A and a consecutive second calibration step B:

first calibration step A: recalibrating a precalibrated nacelle position of at least one wind turbine to be calibrated based on an evaluation of computed power ratios and predetermined power ratios between at least one downstream wind turbine and at least one upstream wind turbine for different wind directions, wherein the at least one upstream wind turbine having a wake effect on the at least one downstream wind turbine, thereby obtaining a calibrated nacelle position of the at least one wind turbine to be calibrated; and second calibration step B: wind direction sector specific further recalibrating of the nacelle position of the at least one wind turbine to be calibrated by applying a wind direction sector specific correction value for an identified wind direction sector to the previously obtained calibrated nacelle position.

According to a first aspect of embodiments of the invention, the method comprises the following steps:

determining at least one upstream wind turbine and at least one downstream wind turbine of the wind farm, the at least one upstream wind turbine having a wake effect on the at least one downstream wind turbine for different wind directions of a wind impinging the at least one upstream wind turbine, computing at least one computed set of power ratios between the at least one downstream wind turbine and the at least one upstream wind turbine for different wind directions, identifying at least one wind direction mismatch by comparing at least one power ratio minimum and/or at least one power ratio maximum in the at least one computed set of power ratios with at least one power ratio minimum and/or at least one power ratio maximum in at least one predetermined set of power ratios for the at least one upstream wind turbine and the at least one downstream wind turbine, and recalibrating a precalibrated nacelle position of at least one wind turbine to be calibrated, the at least one wind turbine to be calibrated being from the at least one downstream wind turbine and the at least one upstream wind turbine, wherein the recalibration is based on the identified at least one wind direction mismatch to obtain a calibrated nacelle position of the at least one wind turbine to be calibrated.

The previously mentioned steps implementing the first calibration step A.

For implementing the second calibration step B, the following steps can be executed:

In embodiments, the method further comprises the wind direction sector specific further recalibrating of the nacelle position of the at least one wind turbine to be calibrated with the further steps of:

identifying a wind direction sector with a remaining wind direction mismatch after the previous recalibration, the remaining wind direction mismatch is identified for a specific wind direction sector of a plurality of wind direction sectors by comparing a power ratio at a given wind direction sector of the at least one computed set of power ratios with at least one power ratio at the given wind direction sector in the at least one predetermined set of power ratios, applying a wind direction sector specific correction value for the identified wind direction sector to the previously obtained calibrated nacelle position of the at least one wind turbine to be calibrated for the identified wind direction sector, thereby obtaining a wind direction sector specific nacelle position of the at least one wind turbine to be calibrated.

At least one or all of the steps of the computer-implemented method may be executed on one or multiple computers. The same or different computers may be used for the different steps of the method. The steps may be performed in the listed order.

In embodiments, the method uses the wording of at least one device or value to make clear that a single device, e.g., a wind turbine, or a single value, e.g., a wind direction mismatch, are sufficient to carry out the calibration method. However, typically, there will be multiple devices, e.g., wind turbines, and multiple values, e.g., wind direction mismatches, to make the best use of the method for calibrating nacelle positions of multiple or all wind turbines in a wind farm and make use of multiple or all the available, determinable, identifiable or computable wind turbines or values to achieve the greatest level of precision for the calibration.

In the determination step of the method, it is determined which of the wind turbines in the wind farms are located upstream and which of the wind turbines are located downstream for different wind directions. An upstream wind turbine is defined as being the one to be first impinged by a wind of a given wind direction, thereby not being exposed to wake. A downstream wind turbine is defined as being the one to be impinged by wind from an upstream wind turbine and thereby experiencing wake. Of course, wind turbines may be both located upstream and downstream of the wind and other wind turbines in the wind farm, depending on the observed wind directions of the wind for that particular wind farm. In the determination step, different wind directions are considered. The different wind directions may be the range of wind directions observed at the particular wind farm for which the method is being executed. Thereby, the entirety of the available field data may be used in the method to get the most precise calibration of the nacelle position of the at least one wind turbine.

In the computing step of the method, at least one computed set of power ratios for different wind directions is computed. In particular, the entirety of wind directions from 0° to 360° or the narrower range of the wind directions observed at the particular wind farm for which the method is carried out may be used. The power ratio is defined as a ratio of the power generated by one wind turbine to the power generated by another wind turbine of the wind farm. The power ratios or set of power ratios computed in the computing step are power ratios of a power generated by one downstream wind turbine to a power generated by one upstream wind turbine or the other way around. Accordingly, the computed set of power ratios are based on actual field data for the different wind directions that are observed at the wind farm. The generated power from the field data may be measured at the respective wind turbines or the power grid, for example. The set of power ratios contains more than one power ratio. The set of power ratios may in particular be a continuous or quasi-continuous set of data of the power ratios as a function of or depending on the wind directions. For each two wind turbines having wake interactions with each other, the set of power ratios may be computed. Accordingly, there may be multiple computed set of power ratios for different upstream wind turbines and downstream wind turbines the generated power of which are set in relation with each other.

In the identification step of the method, wind direction mismatches are identified based on the computed set of power ratios and a predetermined set of power ratios. In particular, power ratio minima and power ratio maxima in the computed set of power ratios for two wind turbines, one of them being upstream and the other one being downstream, are compared with power ratio minima and power ratio maxima in the predetermined set of power ratios for the same two wind turbines. The power ratio minima and power ratio maxima at certain wind directions occur due to the wake of the upstream wind turbine impinging the downstream wind turbine and thereby reducing the power generated by the downstream wind turbine compared to the upstream wind turbine.

The predetermined set of power ratios is estimated to be more or less accurate. The computed set of power ratios on the other hand may be close to the predetermined set of power ratios or far away from the predetermined set of power ratios depending on the accuracy of the nacelle position of the wind turbines. If the wind turbines are poorly calibrated, meaning that they have significantly false nacelle positions, the computed set of power ratios will show power ratio minima and power ratio maxima at different wind directions than the predetermined set of power ratios does. Comparing the power ratio minima and power ratio maxima of the different sets of power ratio delivers an individual wind direction mismatch for each one of the power ratio minima and power ratio maxima. The wind direction mismatch is the difference in wind direction (measurable in degrees) between the power ratio minima or maxima due to the same wake between the predetermined set of power ratios and the computed set of power ratios.

In the recalibration step, a precalibrated nacelle position of the at least one wind turbine to be calibrated is recalibrated. This means that an initial or precalibrated nacelle position, which may be roughly calibrated, of the at least one wind turbine, which is from the upstream and downstream wind turbines determined in the determination step, is refined. The recalibration may be based on the identified wind direction mismatches between the at least one wind turbine to be calibrated and all the other wind turbines in the wind farm having wake interactions at certain wind directions, i.e., being upstream or downstream wind turbines as determined in the determination step. The wind direction mismatches represent errors in the precalibrated nacelle position of the at least one wind turbine to be calibrated, located by comparing the location in terms of wind direction of the power ratio minima and maxima due to the wake interactions. These wind direction mismatches are being used to obtain a calibrated nacelle position of the at least one wind turbine to be calibrated.

Accordingly, embodiments of the invention provide for a computer-implemented calibration method capable of recalibrating poorly precalibrated nacelle positions of wind turbines by determining their wake interactions with each other and the power ratios resulting therefrom. A stopping of the wind turbine to be calibrated is not necessary as in the state of the conventional art. In embodiments, the method can handle wind farms on complex terrain, because the method is based on determining wake interactions and the influence from orography is thereby accounted for.

In embodiments, the method provides an advantage that first—step A—a calibration takes place between the upstream and the downstream turbines for a wide range of wind direction angles, desirably for 360°. A single wind direction angle calibration value is determined. With step B then a fine tuning is applied for some wind direction sectors. A wind direction sector may be be a narrow range of wind directions, for example for wind directions between 260° to 270° and another wind direction sector being from 270° to 280°. So, the whole 360° range of angles can be divided into sectors. Step B then allows to provide a wind direction sector specific correction value as it can happen that the single calibration value provides a perfect correction for some ranges of angles, but not for overall 360°. This can be caused by effects of the terrain surrounding the wind turbines.

In an example, in consequence step A may result in that the downstream turbines should be recalibrated to +5° for all wind directions, but for the range of 260° to 270° this value needs a correction by −1.5°. In consequence this would mean that for the downstream wind turbines a recalibration is performed by +5° for wind directions 0° to 260° and 270° to 360°, and in the range of 260° to 270° a different recalibration value is used, namely +5° minus 1.5°, therefore +3.5°.

The at least one computed set of power ratios and/or the at least one predetermined set of power ratios may be determined as a function of a range of the different wind directions. The computed and/or predetermined set of power ratios may be continuous or quasi-continuous. In other words, the set of power ratios may be continuously or quasi-continuously computed or predetermined data. The identification step may thereby be executed with a full or near-full set of field data and predetermined data. The function may be visualized by a graph.

In particular, the at least one predetermined set of power ratios may be based on a simulation or model. The simulation may be performed during carrying out the method according to the first aspect of embodiments of the invention or upfront. For the simulation, a simulation model of the wind farm may be used. Upfront means that the simulation has been performed prior to the calibration method and the simulation data, in particular the at least one predetermined set of power ratios, may be taken from a database stored in a storage medium. This has significant benefits with respect to calculation time, and such simulation may be performed on a different computer than the one being used to execute the calibration method. Accordingly, a cost-effective computer may be chosen for executing the calibration method by outsourcing the simulation to a more capable computer.

It may be provided that several wind direction mismatches are identified. Accordingly, several power ratio minima and/or power ratio maxima in the at least one computed set of power ratios are compared with several power ratio minima and power ratio maxima in the at least one predetermined set of power ratios. In other words, several different wakes are considered for identifying the wind direction mismatches. This enables higher accuracy for the calibration compared to considering only a single wake or few wakes, where due to orography effects in complex terrain the accuracy may be poor.

A measure of central tendency may be calculated from the several wind direction mismatches. The precalibrated nacelle position of the at least one wind turbine to be calibrated may be recalibrated based on the computed measure of central tendency to obtain the calibrated nacelle position of the at least one wind turbine to be calibrated. Thereby, several wind direction mismatches may be used in a simple calculation manner to get a more precise calibration of the nacelle positions of the at least one wind turbine.

As a measure of central tendency, a median value or mean value may be computed. These measures of central tendency have shown good results for the calibration of the nacelle positions of the wind turbines to be calibrated.

In slightly different terms as explained before, the method may further comprise calibrating a wind direction dependent nacelle position—the wind direction sector specific further recalibrating of the nacelle position—of the at least one wind turbine to be calibrated for a given wind direction. This may be done by carrying out the following steps, performed as step B after the execution of step A:

- identifying at least one further or one remaining wind direction mismatch by comparing at least one power ratio at the given wind direction in the at least one computed set of power ratios with at least one power ratio at the given wind direction in the at least one predetermined set of power ratios,
- adding the identified further wind direction mismatch to the calibrated nacelle position of the at least one wind turbine to be calibrated (i.e., applying a wind direction sector specific correction value for the identified wind direction sector to the previously obtained calibrated nacelle position of the at least one wind turbine to be calibrated for the identified wind direction sector), thereby obtaining the wind direction dependent nacelle position—i.e., the wind direction sector dependent nacelle position—of the at least one wind turbine to be calibrated.

The idea behind this further calibration is that the calibration based on the wind direction mismatches calculated from the power ratio maxima and minima delivers a good result for the nacelle position of the wind turbine, which may be very close to the actual nacelle position. However, there may still be some significant deviation for some wind direction sectors. By including the wind direction mismatch at the particular wind direction or wind direction sector into the calibration, a nacelle position specific for that wind direction (sector) or depending from that wind direction (sector) may be obtained, which comes even closer to the actual nacelle position for all possible wind direction angles.

Further, it may be provided that the at least one power ratio for the given wind direction is located between a power ratio minimum and a power ratio maximum of the computed set of power ratios and an interpolation is performed for identifying the further wind direction mismatch. The interpolation is performed between the power ratio minima and maxima to achieve a more precise wind direction dependent nacelle position.

In embodiments, the method may further comprise a step or steps of precalibrating the nacelle position of the at least one wind turbine to be calibrated based on a precalibrated nacelle position of at least one precalibrated wind turbine of the wind farm. The precalibrating step is performed prior to steps A and B.

The precalibration of the nacelle position of the at least one wind turbine to be calibrated may have the steps of:

- determining a raw nacelle position of the at least one wind turbine to be calibrated,
- determining a precalibrated nacelle position of at least one precalibrated wind turbine of the wind farm,
- computing a correction for the raw nacelle position of the at least one wind turbine to be calibrated based on the precalibrated nacelle position of the at least one precalibrated wind turbine, and
- applying the computed correction to the raw nacelle position of the at least one wind turbine to be calibrated such that the precalibrated nacelle position of the at least one wind turbine to be calibrated is obtained.

The precalibration may be performed by trigonometry, using a compass or using wind farm data to detect a specific wake, for example, and does not need to be very accurate.

The at least one power ratio maximum and/or the at least one power ratio minimum in the at least one computed set of power ratios and/or the at least one predetermined set of power ratios may be of a magnitude (or, in other words, prominence) of at least 0.1, in particular of at least 0.2, from an adjacent minimum and/or maximum of the at least one computed set of power ratios and/or the at least one predetermined set of power ratios. The magnitude or prominence is a defined threshold, in particular in both field data and simulation data. Thereby, the power ratio minima and maxima may be preselected for more precise calibration. In particular, it may be ensured that power ratio minima and maxima based on actual wakes or at least significant wakes are taken into account in the method, but noise and other effects are excluded, which otherwise might lead to improper calibration.

According to a second aspect of embodiments of the invention, the initially stated aspect is solved by a system comprising a system or means for carrying out the method according to the first aspect of embodiments of the invention.

The system may be formed by or have as means one or more computers or one or more controllers having a computer. The at least one computer or the at least one controller may be implemented in one or all of the wind turbines of the wind farm or may be located separate from the wind turbines at a location of the wind farm or a location different from the one of the wind farms.

In particular, the system may be the wind farm having the plurality of spatially distributed wind turbines. Accordingly, the wind farm may have as means the one or more computers or the one or more controllers having a computer, which may be implemented in one or all of the wind turbines of the wind farm or may be located separate from the wind turbines at a location of the wind farm or a location different from the one of the wind farms. The one or more computers or the one or more controllers having a computer may be connectable or connected, in particular wirelessly, to at least one, several or all wind turbines of the wind farm or a wind farm controller of the wind farm, which may be connected or connectable, in particular wirelessly, to at least one, several or all wind turbines of the wind farm. Via the connections, respective data, in particular of measured wind directions, generated power and nacelle positions, may be shared.

According to a third aspect of embodiments of the invention, the initially stated aspect is solved by a computer program comprising instructions which, when the computer program is executed by a computer, cause the computer to carry out the method according to the first aspect of embodiments of the invention.

According to a fourth aspect of embodiments of the invention, the initially stated aspect is solved by a computer-readable (storage) medium comprising instructions which, when executed by a computer, cause the computer to carry out the method according to the first aspect of embodiments of the invention. The computer-readable (storage) medium may be part of the controller of the system.

BRIEF DESCRIPTION

Some of the embodiments will be described in detail, with reference to the following FIGURES, wherein like designations denote like members, wherein.

DETAILED DESCRIPTION

Figure 1:
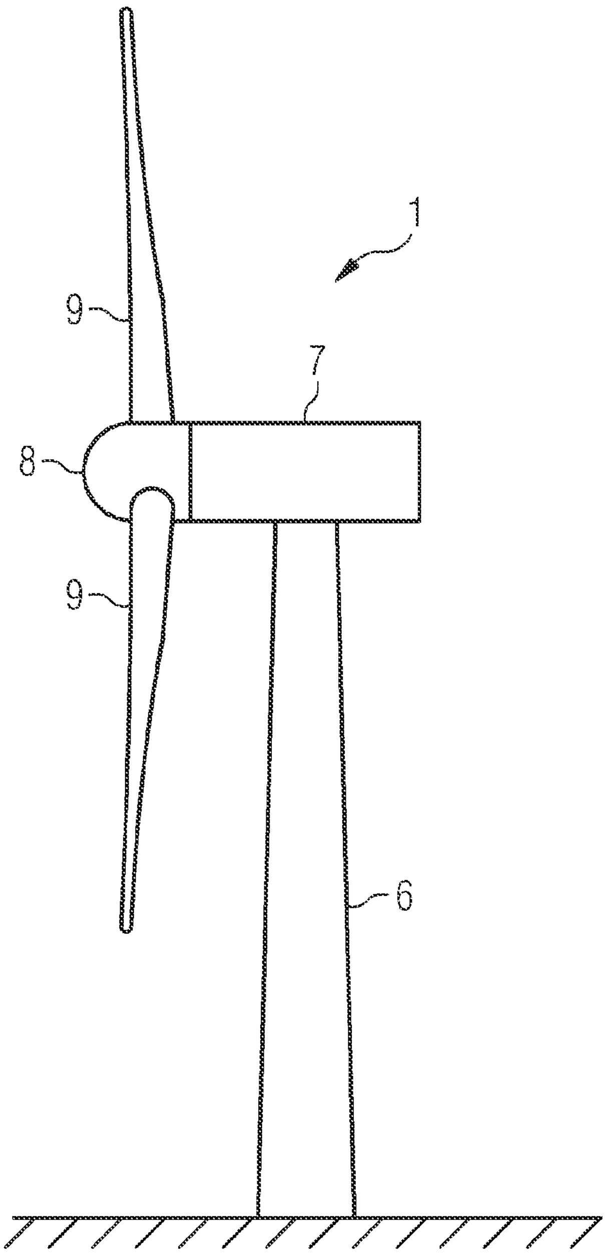
FIG. 1 shows a side view on a wind turbine for use in a wind farm.

FIG. 1 shows a wind turbine 1. The wind turbine 1 comprises a supporting tower 6 and a nacelle 7, wherein the nacelle 7 is attached to the supporting tower 6. The wind turbine 1 further comprises a rotor 8 and a number of wind turbine blades 9 attached thereto. The wind turbine 1 also comprises a yaw system (not shown) for yawing the nacelle 7 relative to the supporting tower 6. By the yawing of the nacelle 7, the rotor 8 and wind turbine blades 9 may be positioned for best performance given the wind directions of a current wind. Also, the wind turbine 1 may comprise an anemometer (not shown) for measuring the wind direction of the wind.

Figure 2:
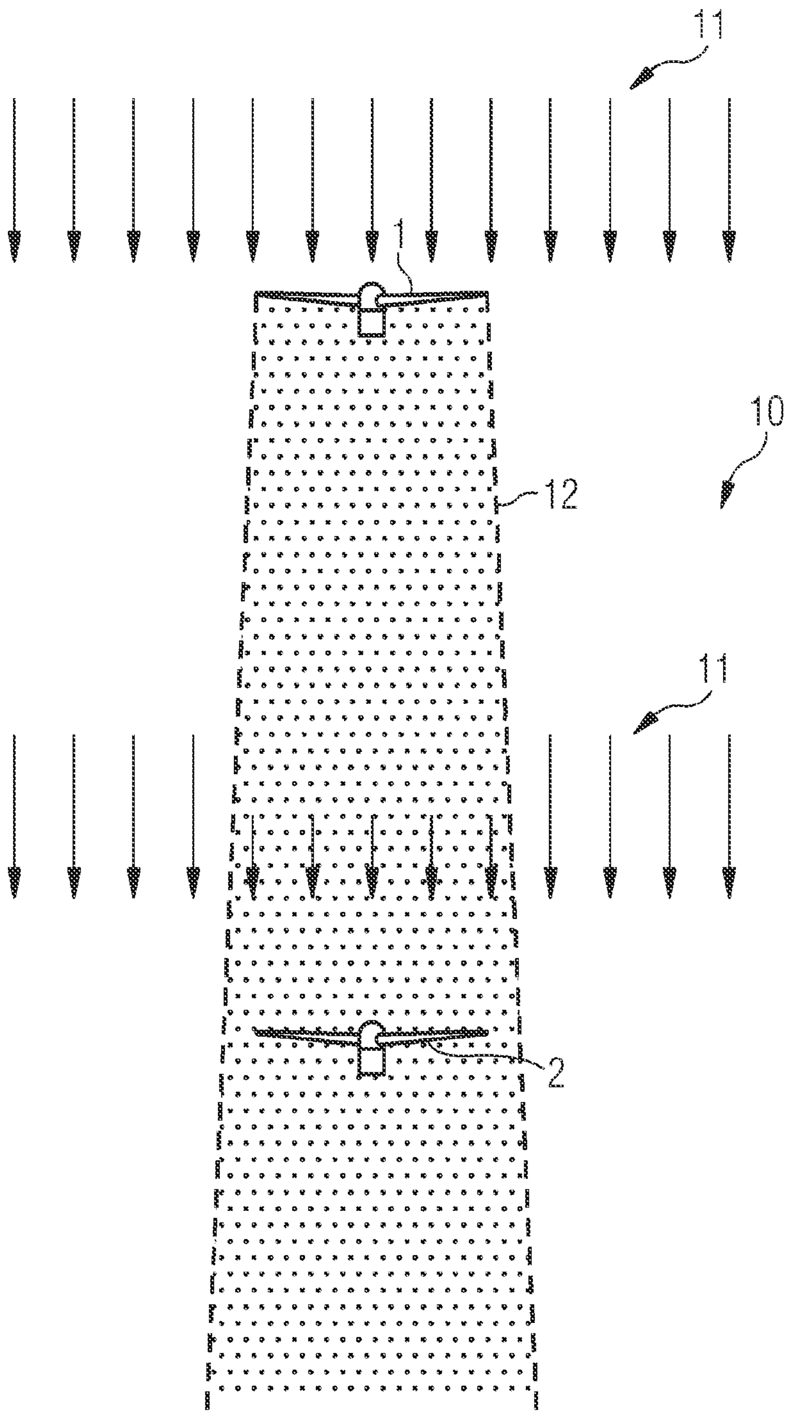
FIG. 2 shows a schematic illustration of a wind farm with two wind turbines, a downstream wind turbine experiencing wake from an upstream wind turbine.

FIG. 2 shows a schematic illustration of a wind farm 10 with two wind turbines 1, 2 having the design as described with reference to FIG. 1. Although the wind farm 10 of this example is only shown with two wind turbines 1, 2, the number of wind turbines 1, 2 of the wind farm 10 may also be much higher, e.g., at least 5 (see FIG. 4, for example), 10, 20 or more.

Given the wind 11 indicated with its direction by the arrows illustrating the wind 11, the wind turbine 1 is located upstream of the wind turbine 2. Accordingly, the wind turbine 1 may also be referred to as the upstream wind turbine 1 as it is in front of the wind 11. The wind turbine 2, on the other hand, may be referred to as a downstream wind turbine 2 because it is located behind the upstream wind turbine 1 given the current wind direction of the wind 11 represented by the arrows. This designation of upstream and downstream of the wind turbines 1, 2 may change with a shift of direction of the wind 11. In particular, other wind turbines not shown in FIG. 2 may then become upstream and/or downstream of the wind 11 located wind turbines 1, 2.

The upstream wind turbine 1 generates electricity based on the energy of the wind 11 impinging on the upstream wind turbine 1 and causes a wake 12 impinging on the downstream wind turbine 2. In the situation shown in FIG. 2, the downstream wind turbine 2 is fully affected by the wake 12. The wake 12 results in a significantly decreased energy production of the downstream wind turbine 2 compared to the upstream wind turbine 1.

It may be possible to deflect the wake 12 from the downstream wind turbine 2 by a wake steering control operation executed by the upstream wind turbine 1. Such situation is shown in FIG. 3.

Figure 3:
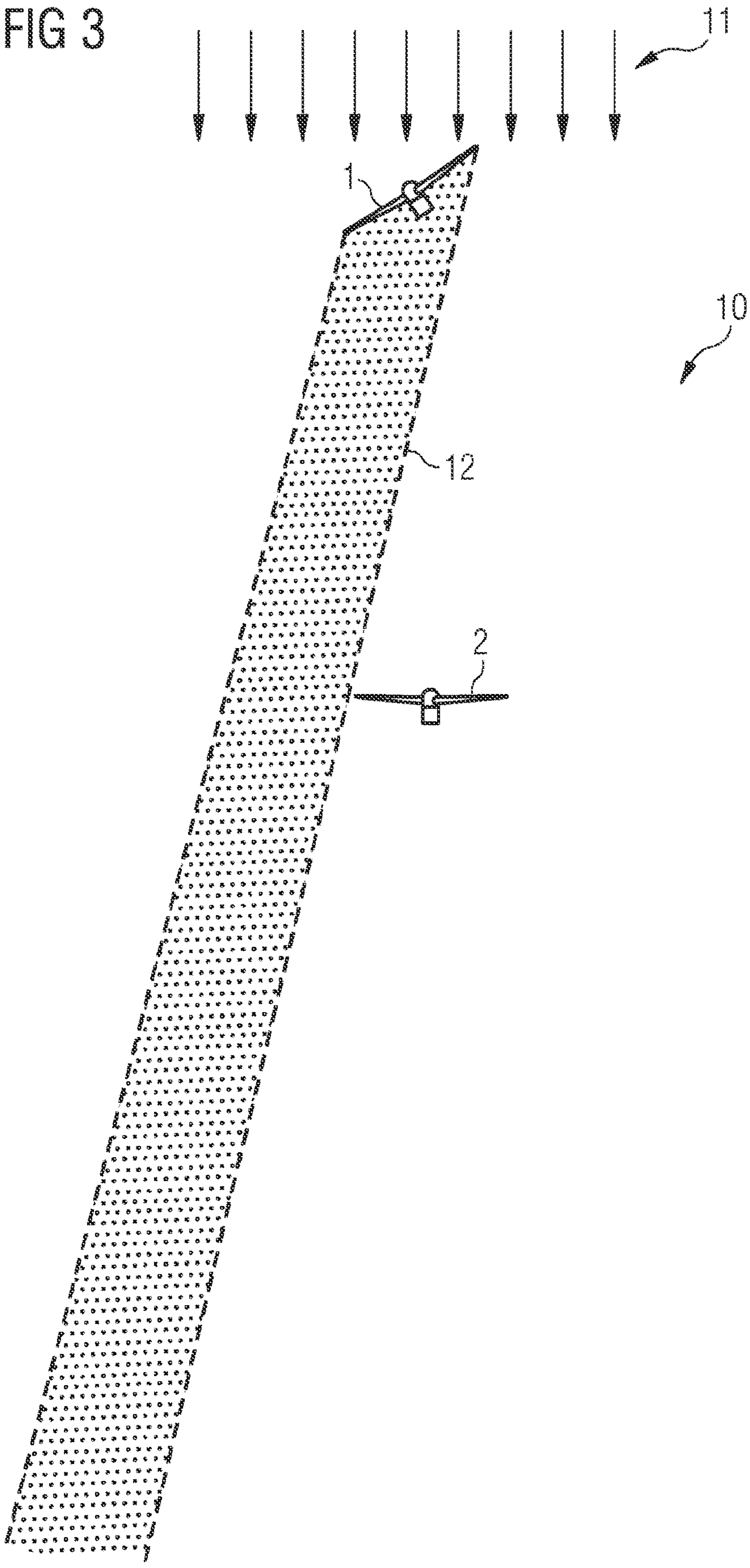
FIG. 3 shows a schematic illustration of a wind farm with the upstream wind turbine executing a wake steering control operation.

In the situation shown in FIG. 3, the yaw system of the upstream wind turbine 1 is misaligned with respect to an optimal positioning into the wind 11 such that the wake 12 may be entirely deflected from the downstream wind turbine 2. Thereby, it may be possible to increase the overall annual energy production of the wind farm 10. However, for best performance, the wake steering control operation requires precise nacelle position data. In other words, a calibration of the nacelle position of the wind turbine 1 must be as precise as possible to increase the performance as much as possible.

Figure 4:
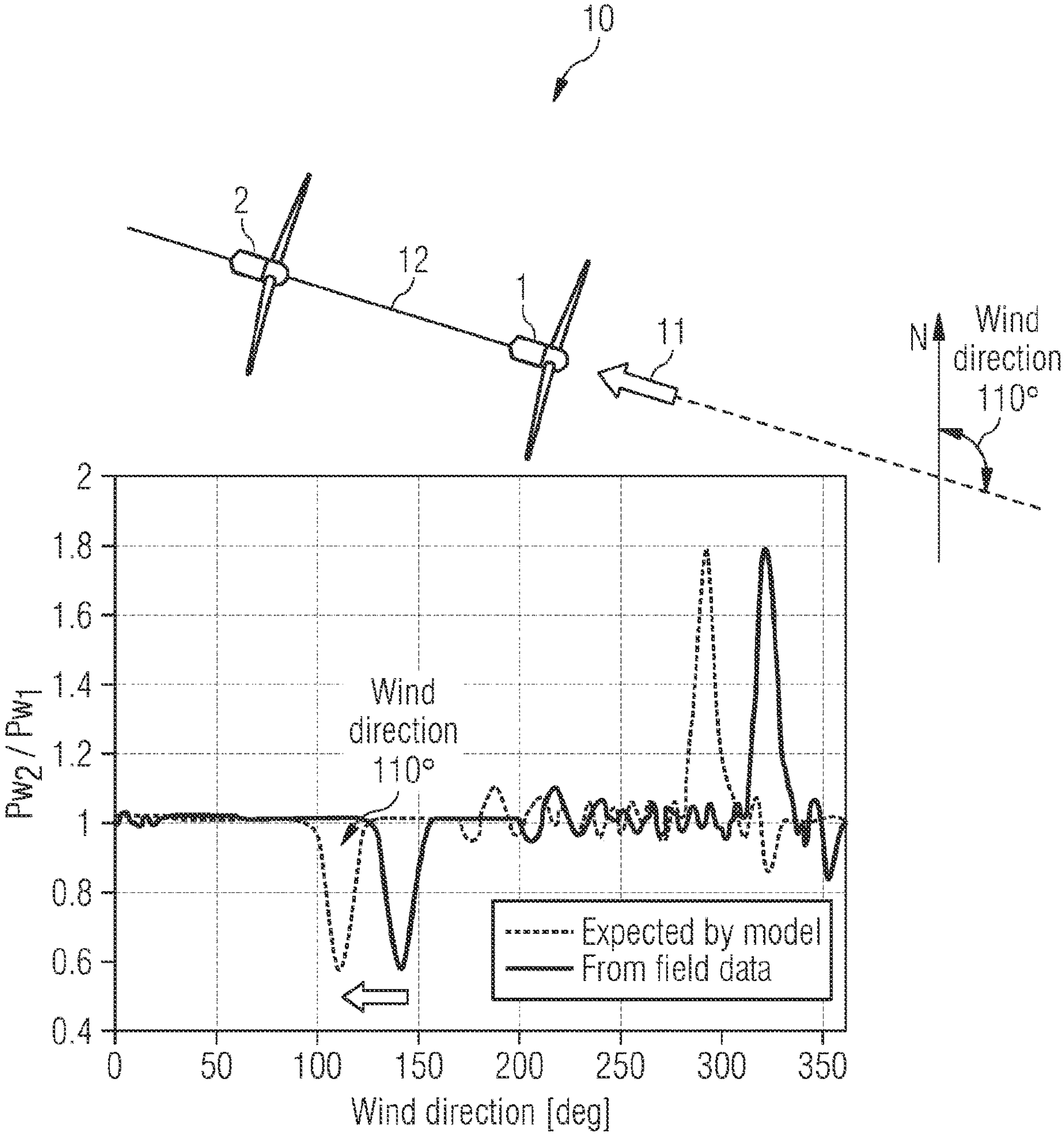
FIG. 4 shows a schematic illustration of the wind farm of FIG. 2 and a power ratio graph.

The calibration method, as explained later with reference to FIG. 7 in more detail, uses the power ratios between the downstream wind turbine 2 and the upstream wind turbine 1 for calibrating any one or both of the wind turbines 1, 2 of the wind farm 10 as illustrated in a graph in FIG. 4. FIG. 4 shows the wind farm 10 of FIG. 3 with the wake 12 from the upstream wind turbine 1 impinging on the downstream wind turbine 2, or in other words, impacting the downstream wind turbine 2. The wind 11 in this example has a wind direction of 110° when measured in clockwise direction relative to a north direction defined as 0° wind direction as seen in FIG. 4. The calibration performed by the methods presented below may therefore also be referred to as a north calibration.

A method for calibrating the wind turbine 1 in the wind farm 10 is exemplary explained in the following. This method is merely an example based on only two wind turbines 1, 2 of the wind farm 10. However, as explained above, there may be a much higher number of wind turbines and wake effects to consider. Also, more than only one power ratio minimum or power ratio maximum as explained in the following may be considered for recalibrating a precalibrated nacelle position of a wind turbine 1, 2 in a wind farm 10.

When two turbines 1, 2 as shown in FIG. 4 are aligned into the prevailing wind, the wake 12 generated by the upstream or front wind turbine 1 causes a loss of power in the downstream or rear wind turbine 2. In embodiments, the method proposed in the following is based on detecting these situations between nearby wind turbines 1, 2 using operational wind farm data to detect the power losses caused by wakes 11 and compare it with wind farm 10 model predictions.

The power ratio graph beneath the schematic illustration of the wind farm 10 shows two curves corresponding to sets of power ratios as functions of the wind direction from 0° to 360°. The power ratios $Pw_2/Pw_1$ are the ratio of the power $Pw_2$ generated by the downstream wind turbine 2 to the power $Pw_1$ generated by the upstream wind turbine 1. The power ratios may alternatively be the other way around, i.e., $Pw_1/Pw_2$.

One of the curves shows a set of power ratios $Pw_2/Pw_1$ from field data and the other one shows a set of power ratios $Pw_2/Pw_1$ expected by a model or simulation. The field data power ratios may also be referred to as the computed set of power ratios because these are being computed based on the power that is generated in the field or, in other terms, in operation of the wind turbines 1, 2. On the other hand, the simulation or model power ratios may be referred to as predetermined power ratios because these are based on an upfront simulation of a model of the wind farm 10.

The computed set of power ratios, as may be seen from its respective curve, shows a drop or, in other words, power ratio minimum at a wind direction of approximately 140°. However, the predetermined set of power ratios, as may be seen from its respective curve, shows the power ratio minimum at a wind direction of approximately 110°. This power ratio minimum occurs due to the wake 12 impinging on the downstream wind turbine 2 when the wind 11 impinges on the upstream wind turbine 1 in a direction of 110° as seen in the schematic illustration of the wind farm 10 in FIG. 4.

The field data is false with respect to its wind direction in this case and thereby the computed set of power ratios indicates the respective power ratio minimum falsely at 140° instead of 110°, which is assumed to be correct based on the simulation. Accordingly, there is a wind direction mismatch of −30°. This means that the nacelle position of the upstream wind turbine 1 is wrong by −30° and needs to be corrected by −30°. A recalibration of a precalibrated nacelle position of the wind turbine 1 may be undertaken by adding the wind direction mismatch of −30° to the precalibrated nacelle position and thereby obtain a calibrated nacelle position.

Figure 5:
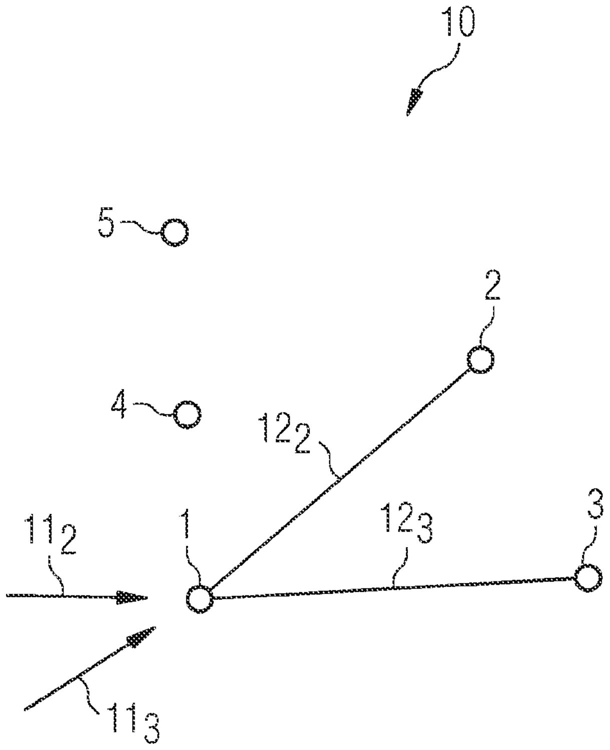
FIG. 5 shows a schematic illustration of a further wind farm having five wind turbines.
Figure 6:
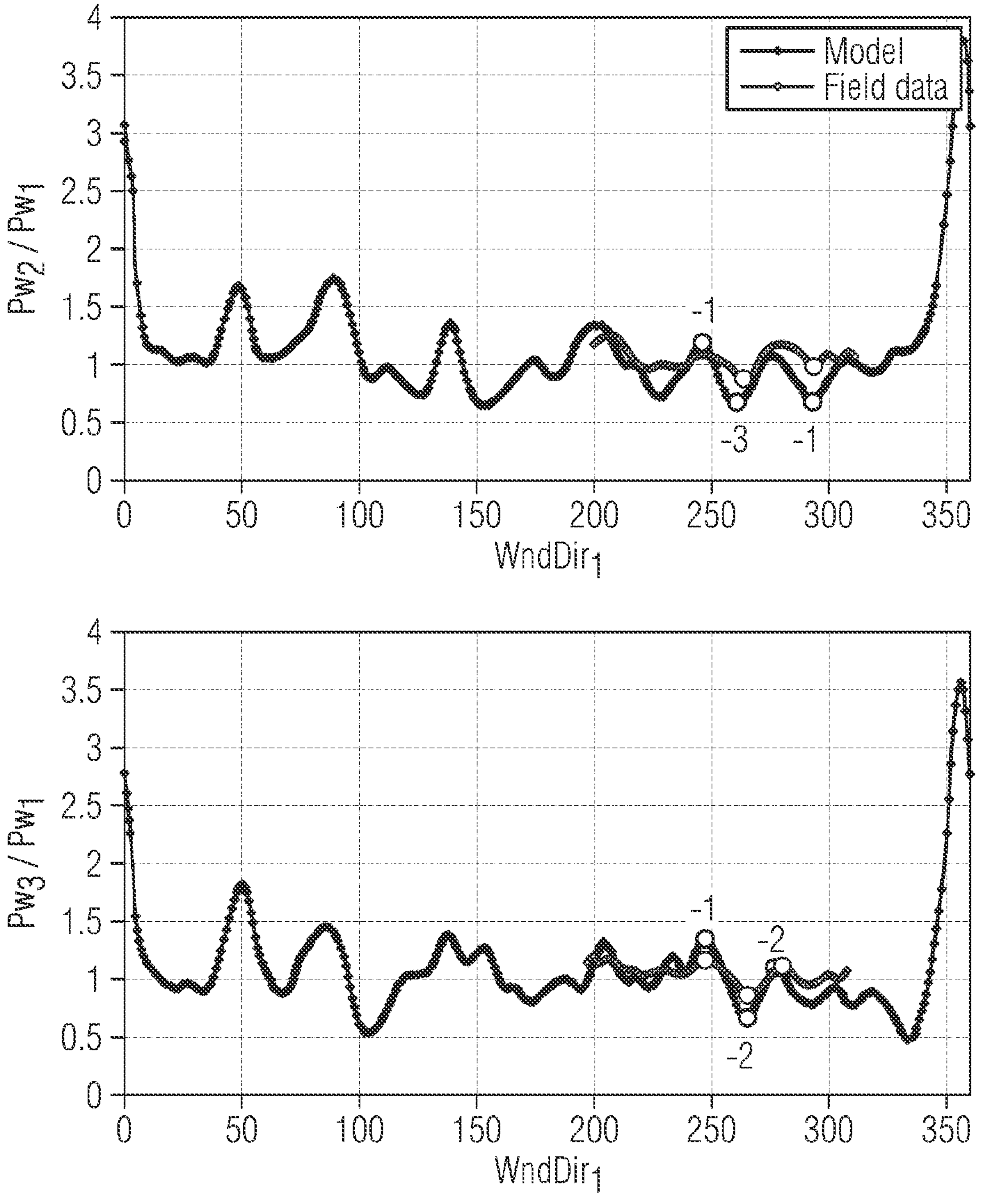
FIG. 6 shows power ratio graphs of three wind turbines of the further wind farm of FIG. 5 being in wake interaction with each other.

FIGS. 5 and 6 show an example with more wind turbines 1, 2, 3, 4, 5 of the wind farm 10 being spatially distributed from one another in a terrain, which may be a complex terrain. In embodiments, the method described above with reference to FIG. 4 may also be applied to this wind farm 10.

FIG. 5 indicates wind $\mathbf{11}_2$, $\mathbf{11}_3$ at two different exemplary wind directions, namely 229.7° for wind $\mathbf{11}_3$ and 266.6° for wind $\mathbf{11}_2$. It is known from simulation that these winds $\mathbf{11}_2$, $\mathbf{11}_3$ will cause wakes $\mathbf{12}_2$ and $\mathbf{12}_3$ at the downwardly of the wind turbine 1 located wind turbines 2 and 3.

FIG. 6 shows the predetermined (model) set of power ratios and the computed (field data) set of power ratios as curves in two separate graphs similar to the illustration of the graph of FIG. 4. The top graph shows the ratio of power generated by the wind turbine 2 to the power generated by the wind turbine 1 as a function of the wind direction measured at the wind turbine 1 ($WindDir_1$). The bottom graph shows the ratio of power generated by the wind turbine 3 to the power generated by the wind turbine 1 as function of the wind direction measured at the wind turbine 1 ($WindDir_1$). The computed set of power ratios in both cases has a limited scale of wind directions from approximately 200° to 310° because these are the wind directions of wind 11 occurring in the wind farm 10 of FIG. 5 and thereby measurable in terms of their power generation.

Figure 7:
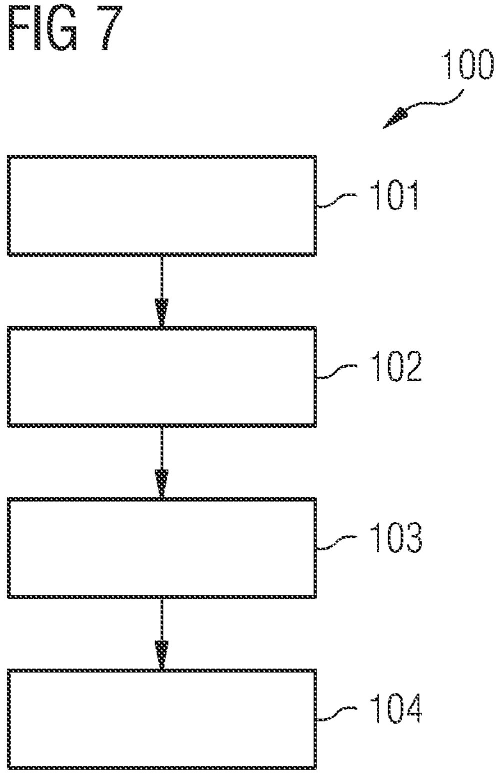
FIG. 7 shows a schematic illustration of a method or calibrating a nacelle position of a wind turbine in a wind farm.

FIG. 7 schematically shows the steps 101, 102, 103, 104 of a computer-implemented method 100 for calibrating a nacelle position in any one or all of the wind turbines 1, 2, 3, 4, 5 of the wind farm 10 in FIG. 5. In embodiments, the method is based on the power ratio principle as explained with reference to FIG. 4, includes the elements of the calibration method explained with reference to FIG. 4 and will be explained in the following with respect to the wind turbines 1, 2, 3 of FIG. 5 and FIG. 6.

In a first step 101 of the computer-implemented method 100, at least one of the wind turbines 1, 2, 3, 4, 5 is precalibrated. This may be done by trigonometry, using a compass, using data from the wind farm 10 to detect a specific wake 12 or similar. This precalibration does not need to be very accurate.

In a second step 102, a rough calibration of the other wind turbines 1, 2, 3, 4, 5 is performed based on the at least one precalibrated wind turbine 1, 2, 3, 4, 5 of the wind farm 10. In this second step 102, raw nacelle positions of the wind turbines 1, 2, 3, 4, 5 to be calibrated are determined. Then, a correction for each of the determined raw nacelle positions of the wind turbines 1, 2, 3, 4, 5 to be calibrated based on the precalibrated nacelle position of the at least one precalibrated wind turbine 1, 2, 3, 4, 5 is calculated. And, finally, in the second step 102 the computed corrections for each one of the wind turbines 1, 2, 3, 4, 5 to be calibrated are applied, e.g., added or subtracted, to their raw nacelle positions such that the precalibrated nacelle position of the wind turbines 1, 2, 3, 4, 5 to be calibrated are obtained. The rough calibration thereby delivers a roughly calibrated or precalibrated nacelle position for each of the wind turbines 1, 2, 3, 4, 5 in the wind farm 10 if only one or some of the wind turbines 1, 2, 3, 4, 5 are precalibrated.

Once each wind turbine 1, 2, 3, 4, 5 has the precalibration performed, which is supposed to be close to the real nacelle position of each one of the wind turbines 1, 2, 3, 4, 5, a more accurate calibration will be calculated using the power ratio technique explained before. Each wind turbine 1, 2, 3, 4, 5 will be compared with other closer wind turbines 1, 2, 3, 4, 5, and all the relevant maxima and minima of the power ratio curve in function of wind direction will be compared with the one predicted by a model of the wind farm 10. FIGS. 5 and 6 show an example where the wind turbine 1 is being calibrated using wind turbines 2, 3. In this example, six different corrections are needed to match the field data and the model. The more accurate calibration is carried out in the third step 103 of the method 100.

The more accurate calibration performed in step 103 may also be referred to as a thin calibration. For the thin calibration, upstream wind turbines 1, 2, 3, 4, 5 and downstream wind turbines 1, 2, 3, 4, 5 of the wind farm 10 for different wind directions of a wind 11 impinging the upstream wind turbines 1, 2, 3, 4, 5 are determined. For the sake of simplicity, as seen in FIG. 5, only the wind turbine 1 will be considered as upstream wind turbine 1 and the wind turbines 2, 3 will be considered as downstream wind turbines 2, 3 to explain the method 100 by example in the following.

Further, for the thin calibration, the computed (field data) sets of power ratios seen in FIG. 6 are computed for the determined wind turbines 1, 2, 3. In this exemplary case, 1-min (or 10-min) field data samples are binned to create the continuous plot. The computed (field data) set of power ratios in the top graph illustrates the power ratio $Pw_2/Pw_1$ showing two power ratio minima and one power ratio maximum having a magnitude of at least 0.2 in terms of the power ratio $Pw_2/Pw_1$ compared to their closest minimum or maximum in the curve or, in other words, computed set of power ratios. In other words, the prominence of the maxima and minima is used, which is the distance between the highest point in a maxima (or lowest in a minima) and the surrounding local extrema. For instance, in FIG. 4 at 110° the prominence is around 0.4 (1-0.6).

Further, in the thin calibration of the third step 103, these power ratio minima and maxima are compared with the power ratio minima and maxima of the predetermined (model) set of power ratios being located in terms of wind direction closest to the wind directions of the power ratio maxima and minima of the computed set of power ratio. A wind direction mismatch between each respective one of the power ratio minima and maxima is identified. This is done by subtracting the respective wind directions of the power ratio minima and maxima of the computed set of power ratios with the respective wind directions of the corresponding power ratio minima and maxima of the predetermined set of power ratios.

As seen in the top graph of FIG. 6, this delivers a wind direction mismatch of −1° for the power ratio maximum, a wind direction mismatch of −3° for the first power ratio minimum and a wind direction mismatch of −1° for the second power ratio minimum.

Similarly, in the bottom graph of FIG. 6, such identification of wind direction mismatches delivers wind direction mismatches of −1°, −2° and −2° for the relevant power ratio minima and maxima.

The identified wind direction mismatches or, in other terms, their values may now be used for recalibrating the precalibrated nacelle position of the wind turbines 1, 2, 3 in the third step 103. For example, a median of the wind direction mismatches identified as described above may be computed as a value for the thin calibration and the median may be added to the roughly calibrated or precalibrated nacelle position of the upstream wind turbine 1 acquired by the rough calibration in step 102. Thereby, a recalibrated or thin calibrated nacelle position of the upstream wind turbine 1 is acquired in step 103.

So far, the discussed embodiment was focusing on the first calibration step A as defined in the initial part of this document.

The recalibrated or thin calibrated nacelle position of the upstream wind turbine 1 is more precise than the precalibrated or roughly calibrated nacelle position but it still may be optimized. For this purpose, a wind direction dependent (or wind direction sector dependent) nacelle position of the wind turbine 1 may be calibrated by a wind direction dependent calibration in step 104.

This step 104 corresponds to the second calibration step B as defined in the initial part of this document.

In step 104, the wind turbine 1 is calibrated for a given wind direction by identifying a further or remaining wind direction mismatch by comparing a power ratio at the given wind direction (or wind direction sector) in the computed set of power ratios with a power ratio at the given wind direction (or wind direction sector) in the predetermined set of power ratio. This further wind direction mismatch is then added to the calibrated nacelle position of the wind turbine 1 to be calibrated, thereby obtaining the wind direction dependent (or wind direction sector dependent) nacelle position of the wind turbine 1.

For example, the wake 12 generated by wind turbine 1 is expected to affect wind turbine 2 at a wind direction of 229.7°, and wind turbine 3 at a wind direction of 266.6°. It may now happen that wind turbine 2 found the wake 12 at 228°, and wind turbine 3 at 268° due to terrain effects. So, a wind direction sector with a remaining wind direction mismatch after the previous recalibration is identified. In order to artificially match the wind farm 10 data with the model expectations, an additional correction in function of wind direction will be needed with +1.7° applied at 228°, and −1.4° at 268° to get these wind direction dependent nacelle positions. Thus, a wind direction sector specific correction value is applied. Accordingly, the (absolute) wind direction based on the measured wind direction itself is corrected. An aspect of this final correction is to fix the fact that the wake is not where it is expected that it should be.

Thus, the following logic is gained:

CalibratedNacellePosition=RawNacellePosition+InitialCorrection+CorrectionBySector, wherein the RawNacellePosition and the InitialCorrection are determined for the whole range of wind direction angles (360°), and wherein CorrectionBySector is a correction value for a wind direction sector, thereby having as a result a CalibratedNacellePosition which is also specific on the wind direction sector.

Thus, the CalibratedNacellePosition could be considered a vector of values, each vector element defining a calibration value for a given wind direction sector. The dimension of the vector is the number of wind direction sectors that are evaluated.

Figure 8:
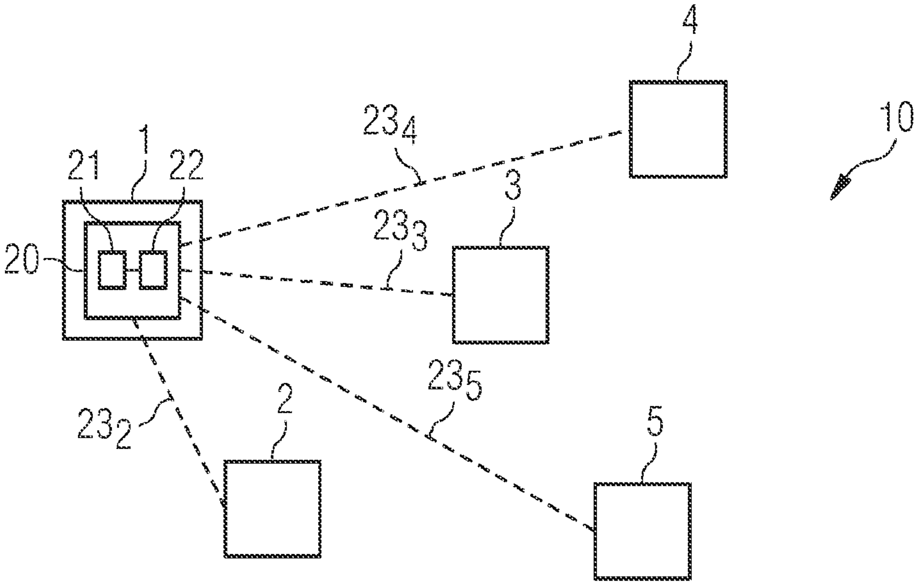
FIG. 8 shows a schematic illustration of a wind farm having a system or means for carrying out the method of FIG. 7.

FIG. 8 schematically shows a system 10 comprising a controller 20 for carrying out the method 100 according to FIG. 7.

The controller 20 in this example is located in one of the wind turbines 1, 2, 3, 4, 5 and has a computer 21 or computing unit for executing the method 100. In embodiments, the method 100 is carried out when a computer program stored in a computer-readable storage medium 22 of the controller 20 is executed. The computer-readable storage medium 22 may further comprise the simulation data of the predetermined set of power ratios.

The controller 20 may alternatively be located at a distance from the wind turbines 1, 2, 3, 4, 5 within the wind farm 10 or away from the wind farm 10. However, the controller may be physically or wirelessly connected to the wind turbines 1, 2, 3, 4, 5 as seen by the connections 232, 233, 234, 235.

The controller 20 may by the connections 232, 233, 234, 235 receive the respective raw nacelle position, values of generated power of the other wind turbines 2, 3, 4, 5 in the field or operation and if necessary other data as described above for recalibrating the wind turbines 2, 3, 4, 5.

Alternatively, each one of the other wind turbines 2, 3, 4, 5 may have such a controller 20 configured as described above for recalibrating its own nacelle position according to the method 100.

Already installed controllers 20 in wind turbines 1, 2, 3, 4, 5 may be used, which may also serve other functions of the wind turbines 1, 2, 3, 4, 5, such as controlling the yaw system for the wake steering control operations, may be used.

Table 1 shows an example of results of the method 100 as explained above but carried out for all wind turbines 1, 2, 3, 4, 5 of a further wind farm 10. Note that the numbers of the nacelle positions are chosen randomly and table 1 is intended to merely explain the method 100 and its results by way of example in more detail.

TABLE 1 results of the calibration method 100 carried out for an exemplary wind farm 10 having five wind turbines (WT) 1, 2, 3, 4, 5.

| step | nacelle position | WT 1 | WT 2 | WT 3 | WT 4 | WT 5 |
|---|---|---|---|---|---|---|
| 101 | raw | 125 | 69 | 340 | 2 | 102 |
| 102 | precalibrated | −23 | 33 | −238 | 100 | 0 |
| 103 | recalibration | 1 | −2 | 0 | 1 | 2 |
| | recalibrated | −22 | 31 | −238 | 101 | 2 |
| 104 | wind direction dependent | | | | | |

In step 101, the raw nacelle position of each one of the wind turbines 1, 2, 3, 4 has been determined.

The wind turbine 5 has been precalibrated, and therefore the precalibration in step 102 is carried out based on the precalibrated nacelle position of wind turbine 5. Each raw nacelle position of the wind turbines 1, 2, 3, 4 is subtracted from the precalibrated nacelle position of wind turbine 5 of 1020 noted in the row raw nacelle position in table 1.

Then, for the recalibration step 103, the above-described technique of identifying the wind direction mismatches based on the power ratio minima and maxima in the computed and predetermined set of power ratios is carried out for all wake interactions of the wind turbines 1, 2, 3, 4, 5. The median of the identified wind direction mismatches is computed as noted in the row of step 103 of table 1 for each one of the wind turbines 1, 2, 3, 4, 5.

Then, the respectively computed median values are added to their respective precalibrated nacelle positions to get the recalibrated nacelle positions of each wind turbine 1, 2, 3, 4, 5. These recalibrated nacelle positions are at least on average expected to be more precise than the precalibrated nacelle positions because the simulation of the predetermined set of power ratios is generally expected to be very precise with respect to the location of the wakes, i.e., in terms of the wind directions of the power minima and maxima.

In the further step 104, as explained above, the wind direction dependent nacelle position may be computed for every single wind direction. This row is intentionally left open in table 1 due to its dependance on the specific wind direction of interest.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for calibrating a nacelle position of at least one wind turbine in a wind farm having a plurality of spatially distributed wind turbines, the method being a computer-implemented method, wherein the method comprises:

- implementing a first calibration step A, comprising: recalibrating a precalibrated nacelle position of the at least one wind turbine to be calibrated based on an evaluation of computed power ratios and predetermined power ratios between at least one downstream wind turbine and at least one upstream wind turbine for different wind directions, wherein the at least one wind turbine to be calibrated is either one of the at least one upstream wind turbine or the at least one downstream wind turbine, wherein the at least one upstream wind turbine has a wake effect on the at least one downstream wind turbine, thereby obtaining a calibrated nacelle position of the at least one wind turbine to be calibrated; and
- implementing a second calibration step B, comprising: further recalibrating the nacelle position of the at least one wind turbine to be calibrated by applying a wind direction sector specific correction value for an identified wind direction sector to the previously obtained calibrated nacelle position, wherein terrain surrounds, and impacts wake interactions between, the at least one upstream wind turbine and the at least one downstream wind turbine, and wherein the wind direction sector specific correction value expresses an influence of orography on the nacelle position of the at least one wind turbine by accounting for effects of the terrain on the wake interactions resulting in increased energy production by the wind farm.

2. The method according to claim 1, wherein the method, for implementing the first calibration step A, comprises:

- determining at least one upstream wind turbine and at least one downstream wind turbine of the wind farm, the at least one upstream wind turbine having a wake effect on the at least one downstream wind turbine for different wind directions of a wind impinging the at least one upstream wind turbine,
- computing at least one computed set of power ratios between the at least one downstream wind turbine and the at least one upstream wind turbine for different wind directions,
- identifying at least one wind direction mismatch by comparing at least one power ratio minimum and/or at least one power ratio maximum in the at least one computed set of power ratios with at least one power ratio minimum and/or at least one power ratio maximum in at least one predetermined set of power ratios for the at least one upstream wind turbine and the at least one downstream wind turbine, and
- recalibrating a precalibrated nacelle position of at least one wind turbine to be calibrated, the at least one wind turbine to be calibrated being selected from the at least one downstream wind turbine and the at least one upstream wind turbine, wherein the recalibration is based on the identified at least one wind direction mismatch to obtain a calibrated nacelle position of the at least one wind turbine to be calibrated;
- and wherein the method, for implementing the second calibration step B, implements the wind direction sector specific further recalibrating of the nacelle position of the at least one wind turbine to be calibrated with the further steps of:
  - identifying a wind direction sector with a remaining wind direction mismatch after the previous recalibration, the remaining wind direction mismatch is identified for a specific wind direction sector of a plurality of wind direction sectors by comparing a power ratio at a given wind direction sector of the at least one computed set of power ratios with at least one power ratio at the given wind direction sector in the at least one predetermined set of power ratios, and
  - applying a wind direction sector specific correction value for the identified wind direction sector to the previously obtained calibrated nacelle position of the at least one wind turbine to be calibrated for the identified wind direction sector, thereby obtaining a wind direction sector specific nacelle position of the at least one wind turbine to be calibrated.

3. The method according to claim 1, wherein the at least one computed set of power ratios and/or the at least one predetermined set of power ratios is determined as a function of a range of the different wind directions.

4. The method according to claim 1, wherein the at least one predetermined set of power ratios is based on a model or simulation, an upfront simulation.

5. The method according to claim 1, wherein more than one wind direction mismatches are identified.

6. The method according to claim 5, wherein a measure of central tendency is calculated from the more than one wind direction mismatches and the precalibrated nacelle position of the at least one wind turbine to be calibrated is recalibrated based on the computed measure of central tendency to obtain the calibrated nacelle position of the at least one wind turbine to be calibrated.

7. The method according to claim 6, wherein a median value or mean value is computed as measure of central tendency.

8. The method according to claim 1, wherein, in the step of identifying a wind direction sector with a remaining wind direction mismatch after the previous recalibration, the at least one power ratio for the given wind direction sector is located between a power ratio minimum and a power ratio maximum of the computed set of power ratios, and an interpolation is performed for identifying the further wind direction mismatch.

9. The method according to claim 1, wherein further comprises precalibrating the nacelle position of the at least one wind turbine to be calibrated based on a precalibrated nacelle position of at least one precalibrated wind turbine of the wind farm.

10. The method according to claim 9, the precalibration of the nacelle position of the at least one wind turbine to be calibrated having the steps of:

receiving a respective nacelle position of the at least one wind turbine to be calibrated, determining a precalibrated nacelle position of at least one precalibrated wind turbine of the wind farm, computing a correction for the respective nacelle position of the at least one wind turbine to be calibrated based on the precalibrated nacelle position of the at least one precalibrated wind turbine, and applying the computed correction to the respective nacelle position of the at least one wind turbine to be calibrated such that the precalibrated nacelle position of the at least one wind turbine to be calibrated is obtained.

11. The method according to claim 1, wherein the at least one power ratio maximum and/or the at least one power ratio minimum in the at least one computed set of power ratios and/or the at least one predetermined set of power ratios is of a magnitude of at least 0.1, or of at least 0.2, from an adjacent minimum and/or maximum of the at least one computed set of power ratios and/or the at least one predetermined set of power ratios.

12. A system for carrying out the method of claim 1.

13. The system according to claim 12, wherein the system is a wind farm having a plurality of spatially distributed wind turbines.

14. A computer program product, comprising a computer readable hardware storage device having computer readable program code stored therein, said program code executable by a processor of a computer system to implement a method comprising instructions, which, when the computer program is executed by a computer, cause the computer to carry out the method of claim 1.

15. A computer-readable medium comprising instructions which, when executed by a computer, cause the computer to carry out the method of claim 1.

* * * * *